United States Patent
Kenyon

(10) Patent No.: US 10,536,259 B1
(45) Date of Patent: Jan. 14, 2020

(54) SUB-RATE PHASE INTERPOLATOR BASED CLOCK DATA RECOVERY ARCHITECTURE WITH PHASE SKEW CORRECTION

(71) Applicant: TEXAS INSTRUMENTS INCORPORATED, Dallas, TX (US)

(72) Inventor: Eleazar Walter Kenyon, Tucker, GA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/259,823

(22) Filed: Jan. 28, 2019

(51) Int. Cl.
*H04L 7/00* (2006.01)
*H04L 7/033* (2006.01)

(52) U.S. Cl.
CPC .......... *H04L 7/0025* (2013.01); *H04L 7/0337* (2013.01)

(58) Field of Classification Search
CPC .......................... H04L 7/0025; H04L 7/0337
See application file for complete search history.

(56) References Cited

U.S. PATENT DOCUMENTS

| 9,548,855 B2 * | 1/2017 | Chattopadhyay ..... H04L 7/0025 |
| 9,742,550 B1 * | 8/2017 | Lugthart ................. H04L 7/033 |
| 9,742,689 B1 * | 8/2017 | Wang ....................... H04L 7/033 |

* cited by examiner

Primary Examiner — Vineeta S Panwalkar
(74) Attorney, Agent, or Firm — John R. Pessetto; Charles A. Brill; Frank D. Cimino

(57) ABSTRACT

A sub-rate (such as half-rate I and Q) phase-interpolator based CDR architecture is configured to receive serial data signals and multiple sub-rate clock signals (such as generated by a VCO either integrated or external). The CDR includes multiple phase interpolators to generate, from respective sub-rate clock signals, respective PI (phase-interpolated) sub-rate clock signals. A CDR loop is configured to receive the input data and the PI sub-rate clock signals, and to generate multiple PI control signals, each to control a respective phase interpolator to align the PI sub-rate clock signals to the data edges. A skew-correction loop includes skew detection circuitry to generate a skew error signal from the PI sub-rate clock signals corresponding to a skew error between the PI sub-rate clock signals, and skew-correction offset circuitry to generate, from the skew error signal, a skew-correction offset signal to modify a selected PI control signal.

19 Claims, 3 Drawing Sheets

US 10,536,259 B1

SUB-RATE PHASE INTERPOLATOR BASED CLOCK DATA RECOVERY ARCHITECTURE WITH PHASE SKEW CORRECTION

BACKGROUND

In serial digital data communication, CDR (clock and data recovery) is used to decode transmitted data symbols with a recovered clock. The receiver uses a locally generated clock (such as from a VCO), which is phase aligned with the data transitions/edges. The CDR function samples the data symbols using the recovered (date edge aligned) clock, "retiming" the input serial data stream.

In sub-rate phase-interpolator based CDR architectures, sub-rate clocks are generated by phase interpolators, each configured to generate from an input sub-rate clock, multi-phase interpolated PI clocks. For example, a half-rate phase-interpolator based CDR system operates with In-phase (I) and Quadrature (Q) clock phases (0 and 90 degrees), generated with I and Q phase interpolators. For each phase interpolator, the CDR loop generates PI control signals to select a phase-interpolated clock phase, adjusted in fine increments for phase tracking and data edge alignment.

Alignment, and thus data sampling margins, are dependent on the I and Q clock phase relationship, which for a half-rate CDR is ideally 1/4 UI. Random delay variations in the CDR phase tracking/alignment loop can skew I-to-Q alignment.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for sub-rate phase-interpolator based CDR architecture including phase interpolation control with skew-correction offset to correct phase-skew errors.

According to aspects of the Disclosure, in a system including serial data communication, a circuit to receive serial data signals includes clock and data recovery. The circuit includes a receiver interface to receive serial data signals with data symbols defined by data edges, and a clock interface to receive multiple sub-rate clock signals. CDR (clock and data recovery) circuitry is configured to receive the serial data signals and the sub-rate clock signals, and includes: multiple phase interpolator circuitries to generate, from respective sub-rate clock signals, respective phase-interpolated (PI) sub-rate clock signals (collectively designated PI sub-rate clock signals); a CDR loop to receive the input data and the PI sub-rate clock signals, and to generate multiple PI control signals, each to control a respective phase interpolator to align the PI sub-rate clock signals to the input data edges; and a skew-correction loop. The skew-correction loop includes: skew detection circuitry to generate a skew error signal from the PI sub-rate clock signals corresponding to a skew error between the PI sub-rate clock signals; and skew-correction offset circuitry to generate, from the skew error signal, a skew-correction offset signal to modify a selected PI control signal.

In other aspects of the Disclosure, a system including serial data communication includes receiver circuitry with a receiver interface to receive serial data signals with data symbols defined by data edges, and to receive multiple sub-rate clock signals, generated either locally (such as with an integrated VCO), or externally and received through a clock interface. The receiver circuitry includes CDR (clock and data recovery) circuitry to receive the serial data signals and the sub-rate clock signals, including: multiple phase interpolator circuitries to generate, from respective sub-rate clock signals, respective phase-interpolated (PI) sub-rate clock signals (collectively designated PI sub-rate clock signals); a CDR loop to receive the input data and the PI sub-rate clock signals, and to generate multiple PI control signals, each to control a respective phase interpolator to align the PI sub-rate clock signals to the input data edges; and a skew-correction loop. The (nested) skew-correction loop includes: skew detection circuitry to generate a skew error signal from the PI sub-rate clock signals corresponding to a skew error between the PI sub-rate clock signals; and skew-correction offset circuitry to generate, from the skew error signal, a skew-correction offset signal to modify a selected PI control signal.

In other aspects of the Disclosure, a method of receiving serial data communication with sub-rate phase-interpolator based clock and data recovery, the method comprising: receiving serial data signals with data symbols defined by data edges; generating multiple sub-rate clock signals; generating, with multiple phase interpolator circuitries, from respective sub-rate clock signals, respective phase-interpolated (PI) sub-rate clock signals (collectively designated PI sub-rate clock signals). The method further includes: in a CDR loop, receiving the input data and the PI sub-rate clock signals, and to generate multiple PI control signals, each to control a respective phase interpolator to align the PI sub-rate clock signals to the input data edges; and in a skew-correction loop, generating a skew error signal from the PI sub-rate clock signals corresponding to a skew error between the PI sub-rate clock signals, and generating, from the skew error signal, a skew-correction offset signal to modify a selected PI control signal.

Other aspects and features of the invention claimed in this Patent Document will be apparent to those skilled in the art from the following Disclosure.

DETAILED DESCRIPTION

This Description and the Drawings constitute a Disclosure for a sub-rate phase-interpolator based CDR architecture including phase interpolation control with skew-correction offset to correct phase-skew errors, including describing design examples (example implementations), and illustrating various technical features and advantages.

An example implementation is a half-rate phase-interpolated CDR architecture, including I/Q phase interpolators generating phase-interpolated I and Q PI clocks.

In brief overview, a sub-rate (such as half-rate I and Q) phase-interpolator based CDR architecture is configured to receive serial data signals and multiple sub-rate clock signals (such as generated by a VCO either integrated or external). The CDR includes multiple phase interpolators to generate, from respective sub-rate clock signals, respective PI (phase-interpolated) sub-rate clock signals. A CDR loop is configured to receive the input data and the PI sub-rate clock signals, and to generate multiple PI control signals, each to control a respective phase interpolator to align the PI sub-rate clock signals to the data edges. A skew-correction loop includes skew detection circuitry to generate a skew error signal from the PI sub-rate clock signals corresponding to a skew error between the PI sub-rate clock signals, and skew-correction offset circuitry to generate, from the skew error signal, a skew-correction offset signal to modify a selected PI control signal.

Figure 1:
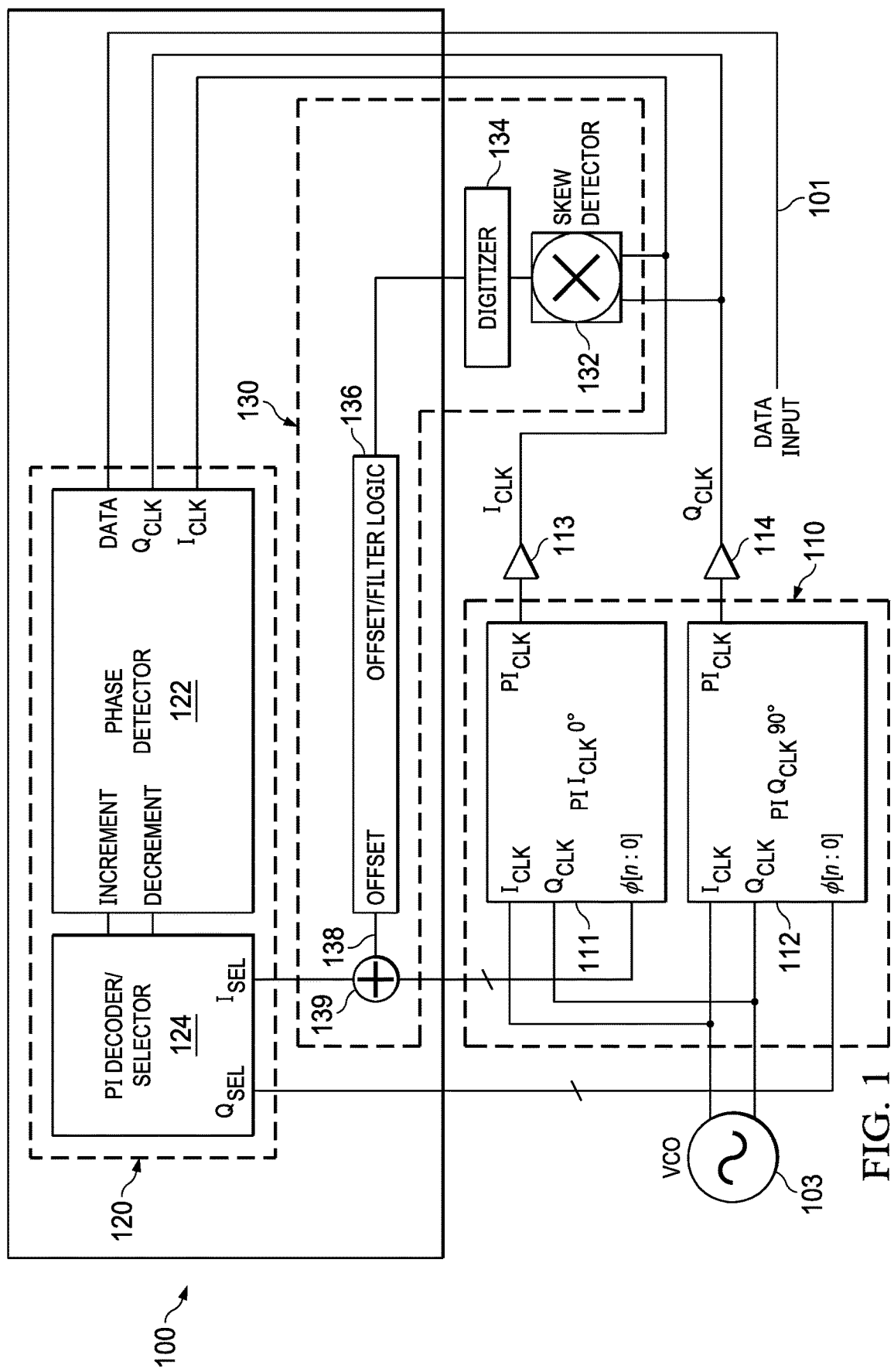
FIG. 1 illustrates an example half-rate (I/Q) phase-interpolator based CDR architecture 100, including a CDR loop with I/Q phase interpolation 110 (phase interpolators 111/112), generating phase-interpolated I and Q clocks, and phase detection/selection 120 (phase detector 122 and PI decoder/selector 124) to provide phase tracking and data edge alignment, outputting ISEL/QSEL PI control signals (φ[n:0]), and including a nested skew-correction loop 130 (I/Q skew detector 132, digitizer 134, and offset/filter logic 136) to provide (digital) skew-correction offset 138 to modify the QSEL PI control signal (φ[n:0]) to correct I/Q phase errors, according to the Disclosure.

FIG. 1 illustrates an example half-rate phase-interpolator based CDR architecture 100. CDR 100 receives an input serial data stream Data Input 101, recovers In-Phase Iclk and Quadrature Qclk, phase aligned with the Input Data transitions/edges. Data Input 101 is edge aligned to the Qclk, and Date Input symbols are sampled with the Iclk edges (also be referred to as retiming).

CDR 100 includes a CDR loop to provide phase tracking and data alignment. CDR 100 includes Iclk and Qclk phase interpolators 110 (111/112) and a phase detector/selector 120. I/Q phase interpolators 111 and 112 receive I and Q clock phases, such as from a VCO 103 (internal or external), and generate (recover) phase-interpolated PI Iclk and PI Qclk, output through buffers 113/114.

Phase detector/selector 120 receives Data Input and the PI Iclk/Qclk, and provides phase tracking and data edge alignment. The phase detector/selector 130 includes a phase detector 122 and a PI decoder/selector 124. Phase detector 122 receives the Data Input and PI Iclk/Qclk, and generates increment/decrement (data edge early/late) inputs to the PI decoder/selector 124. PI decoder/selector 124 decodes the increment/decrement data edge alignment signals, and generates Isel and Qsel phase interpolator control signals φ[n:0] input to the I and Q phase interpolators 111 and 112.

According to aspects of the Disclosure, the CDR phase tracking/alignment loop includes a nested skew-correction loop 130 to provide (digital) skew-correction offset to modify the PI control signal Qsel (φ[n:0]) to correct I/Q phase errors. The skew-correction loop includes an I/Q skew detector 132, digitizer 134, and offset/filter logic 136.

IQ skew detector 132 receives the phase interpolated PI Iclk and Qclk from the I/Q phase interpolators 111/112. The IQ skew detector can be implemented with a mixer (for example, to take advantage of existing hardware). Digitizer 134 digitizes the output of skew detector 132 for input to the offset/filter logic 136. Digitizer 134 can include low pass filtering.

Offset/filter logic 136 generates, from the skew detection result (digitized), a PI offset control signal 138. Offset/filter logic 136 is configured for a specified loop gain and bandwidth. The PI offset control signal 138 is summed 139 with the Qsel PI control signal, adjusting the Qsel control value φ[n:0].

For the sub-rate (example half-rate I/Q) phase-interpolator based CDR architecture according to the Disclosure, the outer phase tracking/alignment loop aligns the PI sub-rate clocks to the data input, and the inner (nested) skew-correction loop aligns the PI sub-rate clocks based on introducing a (digital) skew-correction offset to the PI control signals.

Note that half-rate is an example implementation. The phase-interpolator based sub-rate clock generator architecture according to the Disclosure can be extended to any sub-rate.

Figure 2:
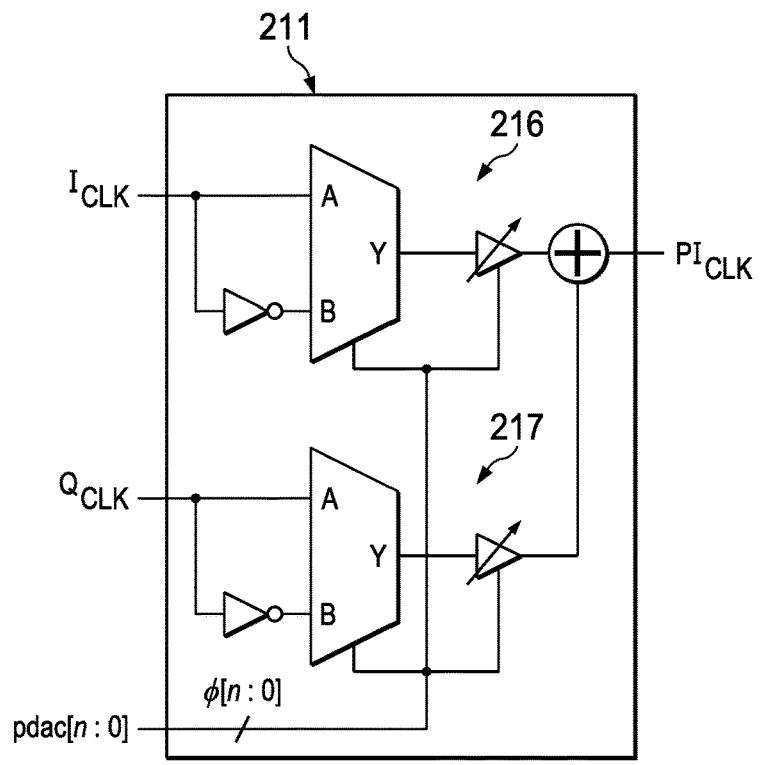
FIGS. 2-3 illustrate an example phase interpolator 211 (phase DACs 216/217), to generate PIclk from input Iclk/Qclk and an input digital PI control signal pdac[n:0], including in FIG. 3 example phase interpolation waveforms for PIclk in phase interpolated increments, and associated pdac control values.

FIG. 2 illustrates an example phase interpolator 211 which can be implemented with I and Q phase DACs 216 and 217. PI 221 receives the Iclk and Qclk offset clock phases (such as from a VCO FIG. 1, 103), and a digital PI control signal pdac[n:0], from the PI selector/decoder 124 (FIG. 1). In response to the PI control signal pdac[n:0], the PI 221 (phase DACs 216/217) generates a phase interpolated PIclk.

Figure 3:
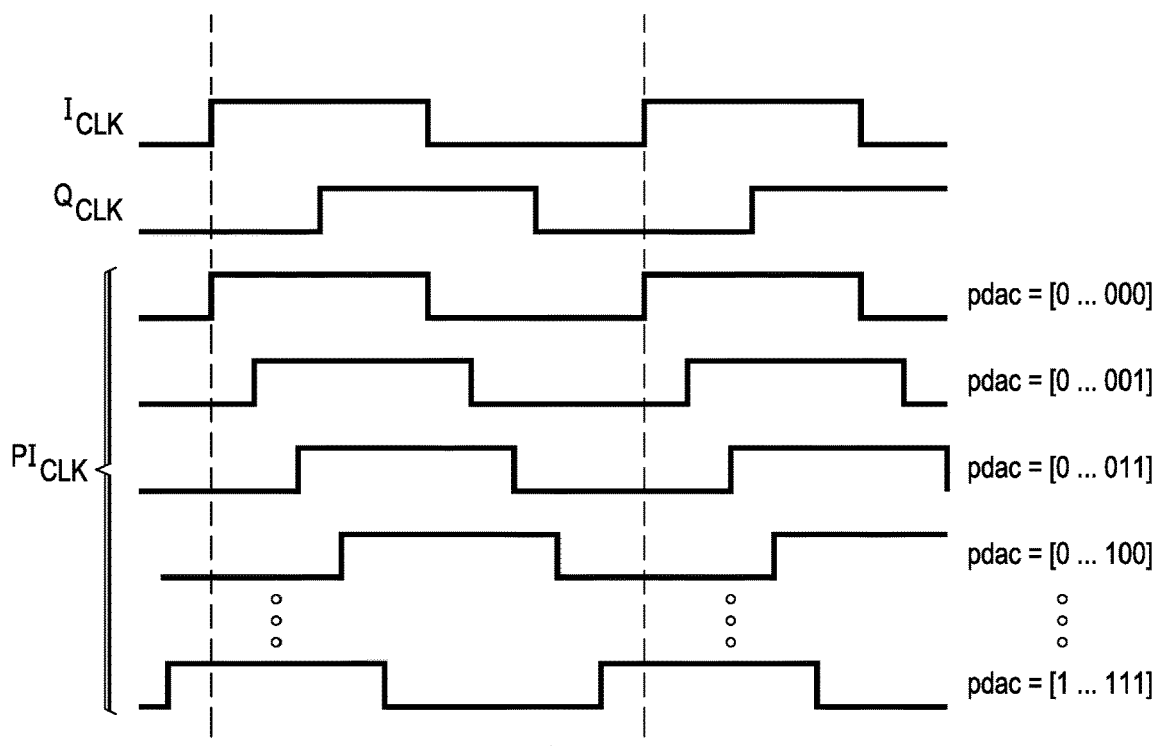

FIG. 3 provides example phase interpolation waveforms for PIclk, in phase-interpolated increments pdac[n:0]. In response to the phase-increment pdac control values pdac[n:0], phase interpolator PI 221 outputs the selected phase-interpolated PIclk.

Figure 4:
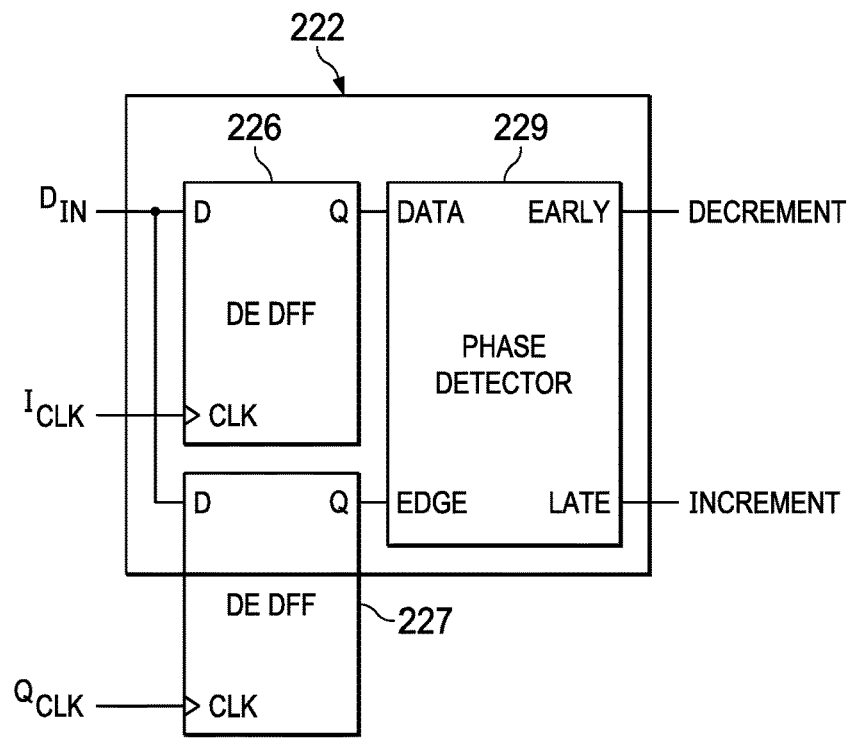
FIGS. 4-5 illustrate example phase detector logic 222 receiving Data DIN and I/Q clks, and generating Decrement/Increment outputs (to the Phase Decoder/Selector), implemented with dual-edge DFFs 226/227, and Data Edge Early/Late phase detection logic 229, including in FIG. 5 example waveforms illustrating data edge Early/Late and Aligned with respect to the quadrature clock (data is aligned to the Q clock, and sampled on the I clock edges).

FIG. 4 illustrates example phase detector logic 222 receiving Data DIN and I/Q clks, and generating increment/decrement (data edge early/late) (inputs to the PI decoder/selector FIG. 1, 124). Phase detector logic 222 can be implemented with dual-edge DFFs 226/227, and Data Edge Early/Late phase detection logic 229.

DE DFF 226 receives the input data DIN, and is clocked by the Iclk from the In-Phase PI (FIG. 1, 111). DE DFF 227 receives DIN, and is clocked by the Qclk from the Quadrature PI (FIG. 1, 112). The DFF 226 Q result provides a Data input to the phase detection logic 229, and the DFF 227 Q result provides an Edge input.

Phase detection logic 229 generates Early/Late Decrement/Increment control signals for input to the PI decoder/selector logic (FIG. 1, 124). The PI decoder/selector logic decodes Decrement/Increment to provide the PI control signals Isel/Qsel to the I/Q phase interpolators.

Figure 5:
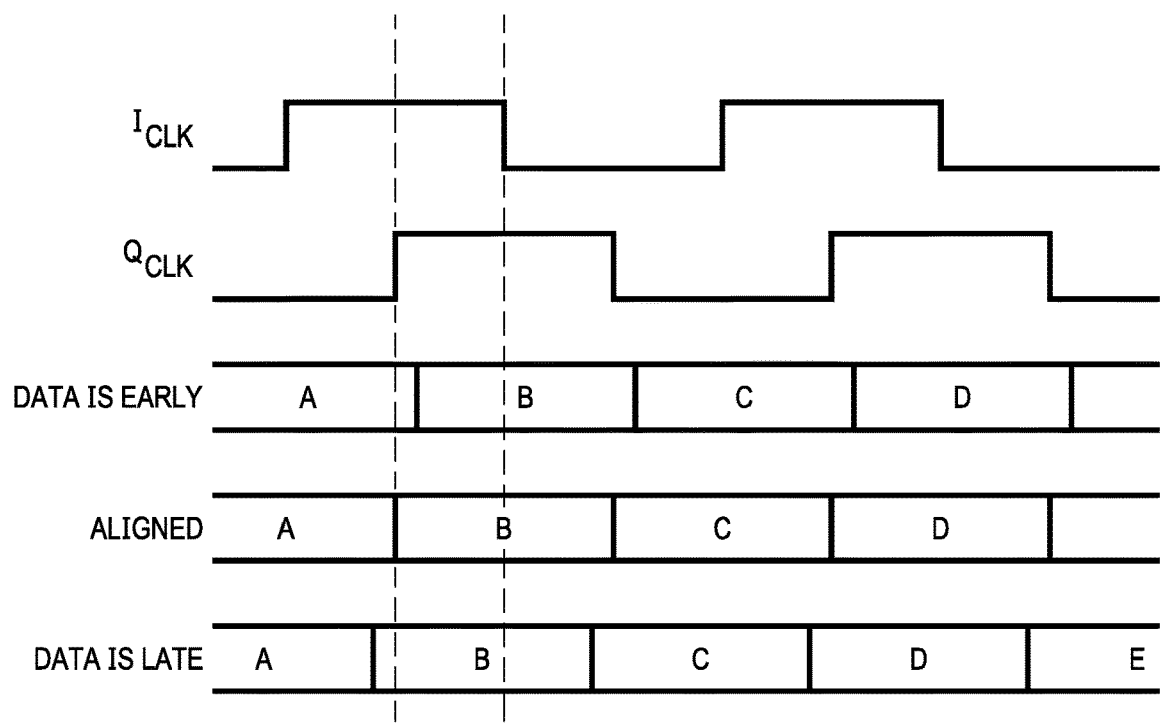

FIG. 5 provides example waveforms illustrating data edge Early/Late and Aligned with respect to the Quadrature Qclk. DFF 237 determines whether the data edge is early or late with respect to the quadrature Qclk (Edge input to the phase detection logic 229). DFF 236 samples the input data with the In-phase Iclk (Data input to the phase detection logic 229).

Referring to FIG. 1, the CDR phase tracking/alignment loop updates the PI control signals φ[n:0] input to the I and Q phase interpolators 111/112, which generate the phase interpolated PIclks Iclk and Qclk. After phase interpolation and buffering, random delay variations can skew I-to-Q alignment.

According to aspects of the Disclosure, the CDR phase tracking/alignment loop includes a nested skew-correction loop 130 to provide (digital) skew-correction offset to modify the PI control signal Qsel (φ[n:0]) to correct I/Q phase errors. The skew-correction loop includes an I/Q skew detector 132, digitizer 134, and offset/filter logic 136.

The example digital skew-correction loop implements the skew detector 132 with a mixer. The PI Iclk/Qclk are mixed to determine skew, and digitized (with low pass filtering) 134 to generate an phase-alignment error signal.

The PI Iclk/Qclk skew error is converted by the offset/filter logic 136 to a digital skew-correction PI offset control signal 138 digital skew-correction offset value. Offset/filter logic 136 is implemented as a bang-bang 0/1 converter, with the offset/filter logic storing the value at which the skew-detector (mixer) output changes polarity, generating a digital PI offset control signal to drive I/Q skew to 1/4UI. Offset/filter logic 136 is configured for a specified loop gain and bandwidth The PI offset control signal 138 is summed 139 with the Isel PI control bus, adjusting the Isel PI control value φ[n:0] to de-skew the phase interpolated PI Iclk/Qclk.

That is, the nested skew-correction loop operates to drive Iclk/Qclk skew to 1/4 UI. In effect, the skew-correction offset can be used to skew the selected PI control bus, either Isel (in the example) or Qsel.

Advantages of the Disclosed phase-interpolator based clock and data recovery (CDR) architecture with skew-correction offset of phase interpolation control to correct phase errors, using (digital) offset phase interpolator controls to correct for clock skew variations, include avoiding modification of high speed clock path, with corresponding reduction in power and noise.

In summary, according to aspects of the Disclosure, a sub-rate phase-interpolator based CDR architecture includes phase interpolation control with skew-correction offset to correct phase-skew errors. CDR circuitry is configured to receive serial data signals, and sub-rate clock signals (such as generated by a VCO, either integrated or external), and includes: multiple phase interpolator circuitries to generate, from respective sub-rate clock signals, respective phase-interpolated (PI) sub-rate clock signals (collectively designated PI sub-rate clock signals); a CDR loop to receive the input data and the PI sub-rate clock signals, and to generate multiple PI control signals, each to control a respective phase interpolator to align the PI sub-rate clock signals to the input data edges; and a skew-correction loop. The skew-correction loop includes: skew detection circuitry to generate a skew error signal from the PI sub-rate clock signals corresponding to a skew error between the PI sub-rate clock signals; and skew-correction offset circuitry to generate, from the skew error signal, a skew-correction offset signal to modify a selected PI control signal. The CDR loop can include phase detector circuitry to generate an alignment error signal corresponding to a misalignment of a sub-rate clock signal with respect to the input data edges, and phase interpolator control circuitry to generate the PI control signals based on the alignment error signal. For an example half-rate implementation, the sub-rate clock signals are in-phase (I) and quadrature (Q) clock signals, and the CDR loop is operable to align the quadrature (Q) clock signal to the input data edges, and to sample the input data symbols with the in-phase (I) clock signal.

In digital implementations, the phase detector circuitry can be configured to generate a digital alignment error signal corresponding to the input data edge being early, late or aligned with the input data edge, and the phase interpolator control circuitry can be configured with decoder circuitry to decode the digital alignment error signal to generate a decoded alignment error signal, and PI selector circuitry to generate digital PI control signals based on the decoded alignment error signal. In the skew-correction loop, the skew detection circuitry can be configured with digitizer circuitry to generate a digitized skew error signal, and the skew-correction offset circuitry can be configured with skew-correction offset logic to generate, from the digitized skew error signal, a digital skew-correction offset signal, and combiner circuitry to combine the digital skew-correction offset signal with at least one digital PI control signal. The skew correction offset logic can be configured to generate from the digitized skew error signal the digital skew-correction offset signal corresponding to an output of the skew detection circuitry changing polarity, and to generate the digital skew-correction offset signal to cause a phase skew between the PI sub-rate clock signals to converge to a corresponding fraction of a UI (unit interval).

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A circuit for use in a system including serial data communication, the circuit including clock and data recovery for received serial data, the circuit comprising:
 a receiver interface to receive serial data signals with data symbols defined by data edges;
 a clock interface to receive multiple sub-rate clock signals;
 CDR (clock and data recovery) circuitry to receive the serial data signals and the sub-rate clock signals, including:
  multiple phase interpolator circuitries to generate, from respective sub-rate clock signals, respective phase-interpolated (PI) sub-rate clock signals (collectively designated PI sub-rate clock signals);
  a CDR loop to receive the input data and the PI sub-rate clock signals, and to generate multiple PI control signals, each to control a respective phase interpolator to align the PI sub-rate clock signals to the input data edges; and
  a skew-correction loop including:
   skew detection circuitry to generate a skew error signal from the PI sub-rate clock signals corresponding to a skew error between the PI sub-rate clock signals, and
   skew-correction offset circuitry to generate, from the skew error signal, a skew-correction offset signal to modify a selected PI control signal.

2. The circuit of claim 1, wherein the CDR circuitry includes in the CDR loop:
 phase detector circuitry to generate an alignment error signal corresponding to a misalignment of a selected sub-rate clock signal with respect to the input data edges; and
 phase interpolator control circuitry to generate the PI control signals based on the alignment error signal.

3. The circuit of claim 2, wherein:
 the phase detector circuitry is configured to generate a digital alignment error signal corresponding to the input data edge being early, late or aligned with the input data edge; and
 the phase interpolator control circuitry comprises:

decoder circuitry to decode the digital alignment error signal to generate a decoded alignment error signal, and PI selector circuitry to generate the PI control signals based on the decoded alignment error signal.

4. The circuit of claim 1, wherein the PI control signals are digital PI control signals, and wherein:

the skew detection circuitry includes:
digitizer circuitry to generate a digitized skew error signal;

the skew-correction offset circuitry comprises:
skew-correction offset logic to generate, from the digitized skew error signal, a digital skew-correction offset signal; and
combiner circuitry to combine the digital skew-correction offset signal with at least one digital PI control signal.

5. The circuit of claim 4, wherein the skew correction offset logic is configured:
to generate from the digitized skew error signal the digital skew-correction offset signal corresponding to an output of the skew detection circuitry changing polarity; and
to generate the digital skew-correction offset signal to cause a phase skew between the PI sub-rate clock signals to converge to a corresponding fraction of a UI (unit interval).

6. The circuit of claim 1, further comprising:
sub-rate clock generation circuitry to generate the multiple input sub-rate clock signals for input to the multiple phase interpolator circuitries through the sub-rate clock input interface.

7. The circuit of claim 1, wherein the sub-rate clock signals are half-rate in-phase (I) and quadrature (Q) clock signals, and wherein the CDR loop is operable to align the quadrature (Q) clock signal to the input data edges, and to sample the input data symbols with the in-phase (I) clock signal.

8. A system including serial data communication, the system comprising:

a circuit including receiver circuitry with a receiver interface to receive serial data signals with data symbols defined by data edges;
the circuit including one of clock circuitry to generate multiple sub-rate clock signals, or a clock interface to receive the multiple sub-rate clock signals which are generated external to the circuit;
the receiver circuitry including CDR (clock and data recovery) circuitry to receive the serial data signals and the sub-rate clock signals, including:
multiple phase interpolator circuitries to generate, from respective sub-rate clock signals, respective phase-interpolated (PI) sub-rate clock signals (collectively designated PI sub-rate clock signals);
a CDR loop to receive the input data and the PI sub-rate clock signals, and to generate multiple PI control signals, each to control a respective phase interpolator to align the PI sub-rate clock signals to the input data edges; and
a skew-correction loop including:
skew detection circuitry to generate a skew error signal from the PI sub-rate clock signals corresponding to a skew error between the PI sub-rate clock signals, and
skew-correction offset circuitry to generate, from the skew error signal, a skew-correction offset signal to modify a selected PI control signal.

9. The circuit of claim 8, wherein the CDR circuitry includes in the CDR loop:
phase detector circuitry to generate an alignment error signal corresponding to a misalignment of a sub-rate clock signal with respect to the input data edges; and
phase interpolator control circuitry to generate the PI control signals based on the alignment error signal.

10. The circuit of claim 9, wherein:
the phase detector circuitry is configured to generate a digital alignment error signal corresponding to the input data edge being early, late or aligned with the input data edge; and
the phase interpolator control circuitry comprises:
decoder circuitry to decode the digital alignment error signal to generate a decoded alignment error signal, and
PI selector circuitry to generate the PI control signals based on the decoded alignment error signal.

11. The circuit of claim 8, wherein the PI control signals are digital signals, and wherein:
the skew detection circuitry includes:
digitizer circuitry to generate a digitized skew error signal;
the skew-correction offset circuitry comprises:
skew-correction offset logic to generate, from the digitized skew error signal, a digital skew-correction offset signal; and
combiner circuitry to combine the digital skew-correction offset signal with at least one digital PI control signal.

12. The circuit of claim 11, wherein the skew correction offset logic is configured:
to generate from the digitized skew error signal the digital skew-correction offset signal corresponding to an output of the skew detection circuitry changing polarity; and
to generate the digital skew-correction offset signal to cause a phase skew between the PI sub-rate clock signals to converge to a corresponding fraction of a UI (unit interval).

13. The circuit of claim 8, wherein the sub-rate clock signals are half-rate in-phase (I) and quadrature (Q) clock signals, and wherein the CDR loop is operable to align the quadrature (Q) clock signal to the input data edges, and to sample the input data symbols with the in-phase (I) clock signal.

14. A method of receiving serial data communication with clock and data recovery, the method comprising:
receiving serial data signals with data symbols defined by data edges;
generating multiple sub-rate clock signals;
generating, with multiple phase interpolator circuitries, from respective sub-rate clock signals, respective phase-interpolated (PI) sub-rate clock signals (collectively designated PI sub-rate clock signals);
in a CDR loop, receiving the input data and the PI sub-rate clock signals, and to generate multiple PI control signals, each to control a respective phase interpolator to align the PI sub-rate clock signals to the input data edges; and
in a skew-correction loop:
generating a skew error signal from the PI sub-rate clock signals corresponding to a skew error between the PI sub-rate clock signals, and
generating, from the skew error signal, a skew-correction offset signal to modify a selected PI control signal.

15. The method of claim 14, wherein the CDR loop comprises:
   generating an alignment error signal corresponding to a misalignment of a sub-rate clock signal with respect to the input data edges; and
   generating the PI control signals based on the alignment error signal.

16. The method of claim 15:
   wherein generating the alignment error signal comprises generating a digital alignment error signal corresponding to the input data edge being early, late or aligned with the input data edge; and
   wherein generating the PI control signals comprises:
      decoding the digital alignment error signal to generate a decoded alignment error signal, and
      generating the PI control signals based on the decoded alignment error signal.

17. The method of claim 14, wherein the PI control signals are digital signals, and wherein the skew-correction loop comprises:
   generating a digitized skew error signal;
   generating, from the digitized skew error signal, a digital skew-correction offset signal; and
   combining the digital skew-correction offset signal with at least one digital PI control signal.

18. The method of claim 17, wherein the skew-correction loop further comprises:
   generating from the digitized skew error signal the digital skew-correction offset signal corresponding to an output of the skew detection circuitry changing polarity; and
   generating the digital skew-correction offset signal to cause a phase skew between the PI sub-rate clock signals to converge to a corresponding fraction of a UI (unit interval).

19. The method of claim 14, wherein the sub-rate clock signals are half-rate in-phase (I) and quadrature (Q) clock signals, and wherein the CDR loop is operable to align the quadrature (Q) clock signal to the input data edges, and to sample the input data symbols with the in-phase (I) clock signal.

* * * * *